(12) United States Patent
Jones

(10) Patent No.: US 7,039,169 B2
(45) Date of Patent: May 2, 2006

(54) DETECTION AND AUTHENTICATION OF MULTIPLE INTEGRATED RECEIVER DECODERS (IRDS) WITHIN A SUBSCRIBER DWELLING

(75) Inventor: M. Jeffrey Jones, Pleasanton, CA (US)

(73) Assignee: LSI Logic Corporation, Milpitas, CA (US)

( * ) Notice: Subject to any disclaimer, the term of this patent is extended or adjusted under 35 U.S.C. 154(b) by 465 days.

(21) Appl. No.: 10/254,185

(22) Filed: Sep. 25, 2002

(65) Prior Publication Data

US 2004/0057565 A1    Mar. 25, 2004

(51) Int. Cl.
   *H04M 11/00*     (2006.01)
(52) U.S. Cl. .............................. 379/93.02; 379/93.07; 379/90.01; 379/102.03; 725/25
(58) Field of Classification Search ........... 379/102.03, 379/102.01, 102.02, 102.07, 106.08, 93.02; 725/1–6, 25, 31, 78
   See application file for complete search history.

(56) References Cited

U.S. PATENT DOCUMENTS

| | | | |
|---|---|---|---|
| 5,307,411 A | * | 4/1994 | Anvret et al. ............... 713/169 |
| 5,422,939 A | * | 6/1995 | Kramer et al. .......... 379/106.08 |
| 5,748,732 A | * | 5/1998 | Le Berre et al. .............. 725/78 |
| 6,405,369 B1 | * | 6/2002 | Tsuria .......................... 725/25 |

FOREIGN PATENT DOCUMENTS

WO    WO 00/04718    * 1/2000

* cited by examiner

*Primary Examiner*—Stella Woo
(74) *Attorney, Agent, or Firm*—Conley Rose, P.C.

(57) ABSTRACT

Apparatus and methods that allow detection and authentication of multiple devices within a subscriber dwelling. A system is described generally comprising multiple devices, each adapted to receive a broadband signal and including a modem coupled to a telephone line. At least one of the devices is configured to receive entitlement information corresponding to the other devices via the broadband signal, and to use the entitlement information to periodically authenticate the other devices via the telephone line. Several methods are disclosed for detecting a device connected to a telephone line. A described method for authenticating a device connected to a telephone line includes receiving entitlement information corresponding to each of the devices via a broadband signal, and using the entitlement information to authenticate each of the devices via the telephone line.

31 Claims, 6 Drawing Sheets

DETECTION AND AUTHENTICATION OF MULTIPLE INTEGRATED RECEIVER DECODERS (IRDS) WITHIN A SUBSCRIBER DWELLING

FIELD OF THE INVENTION

This invention relates generally to systems and methods for providing communicated services such as television programming and, more particularly, to systems and methods for providing exclusive access to communicated services.

BACKGROUND OF THE INVENTION

Conditional access (CA) refers generally to a technology used to control access to communicated services such as television programming. Several different CA schemes currently exist. The transmissions conveying such communicated services are typically scrambled or encrypted, and only authorized users are provided with means to descramble or decrypt the transmissions. Scrambling typically involves modifying a transmission signal by, for example, removing synchronization pulses. Encryption typically involves modifying digital data conveyed by the transmission signal according to a particular cryptographic algorithm. Conditional access has been used for many years to provide exclusive access to premium television channels and special broadcasts (e.g., sporting events and pay-per-view movies). Conditional access can also be used to provide exclusive access to digital radio broadcasts, digital data broadcasts, and interactive services. Known CA technologies for scrambling or encrypting television transmissions include VideoCrypt™ (Thomson Consumer Electronics, S A FR), VideoCipher® and DigiCipher® (NextLevel Systems, Inc., Chicago, Ill.).

A typical CA system is used to scramble or encrypt television programming, and generally includes CA encoding equipment integrated into broadcast equipment (e.g., cable, satellite, or terrestrial broadcast equipment) at a service provider's location. In general, the CA encoding equipment modifies (i.e., scrambles or encrypts) information conveyed by a transmission signal produced by the broadcast equipment. Where the CA encoding equipment employs encryption, the CA encoding equipment encrypts digital data (e.g., digitized video and audio information), and the broadcast equipment transmits a signal conveying the encrypted digital data to the subscribers. The CA encoding equipment may also insert messages into the transmission signal that provide information necessary for decryption of the encrypted digital data.

The typical CA system also includes CA decoding equipment at each subscriber's location. The CA decoding equipment typically includes a box receiving the transmission signal capable of being coupled to a television set or other display means. Such boxes are commonly referred to as "set-top boxes" or integrated receiver decoders (IRDs). A typical IRD decrypts the encrypted digital data in the transmission signal, converts the digital data to analog signals (e.g., analog video and audio signals), and provides the analog signals for display on a television set or other display means.

Messages that provide information necessary for decryption of the encrypted digital data are typically passed to a security module within an IRD. The security module extracts the information from the messages, and uses the information to authorize the decryption of the encrypted digital data. The security module is usually in the form of a "smart card." In general, a smart card is a plastic card about the size of a credit card that has a signal processing integrated circuit (IC) embedded therein. A smart card is typically inserted into a card reader of the IRD that couples signals between the IRD and the smart card.

The IC in the smart card processes the information necessary for decryption of the encrypted digital data in the transmission signal. For example, the IC in the smart card may use the information to generate a decryption key, and provide the decryption key to a decoder within the IRD. The decoder may use the decryption key to decrypt the encrypted digital data, thereby reproducing the digital data (e.g., digital video and audio data). The IRD may convert the digital video and audio data to analog video and audio signals, respectively, and provide the analog signals to the television set for display.

Many subscribers have several television sets in their dwellings, and want conditional access services available at two or more of the television sets. In this situation, a subscriber typically has 2 options: (i) use a single IRD to select programming and provide the selected programming to the other television sets, or (ii) have multiple IRDs, one for each television set, so that different programming can be selected at each of the television sets.

Subscribers that opt for the multiple IRD option often balk at having to pay the full rate for the multiple required smart cards—one for each IRD. For this reason, conditional access service providers generally offer subscribers one smart card at a full rate and additional smart cards at a reduced rate. This creates several problems for the conditional access service provider. First and foremost, one or more of the IRDs may be removed from the dwelling and installed in another dwelling without the service provider's knowledge. In this situation, the inhabitants of the other dwelling essentially gain the benefit of the conditional access services without the service provider receiving the full rate.

In addition, there are security issues with providing multiple authentication devices to a subscriber. For example, if the multiple smart cards are provided to the subscriber through the mail, that item of mail may become lost or intercepted. In this situation, multiple instances of unauthorized usage of the services may occur until the problem is discovered and the devices are invalidated within the network.

SUMMARY OF THE INVENTION

The present invention is directed to apparatus and methods that allow detection and authentication of multiple IRDs in a subscriber dwelling. In an embodiment of the invention, a disclosed device is adapted to receive a broadband signal, and includes a modem adapted for coupling to a telephone line. The device is configured to receive entitlement information corresponding to at least one other device via the broadband signal, and to use the entitlement information to periodically authenticate the at least one other device via the telephone line.

In another embodiment of the invention, a system is described including multiple devices, each adapted to receive a broadband signal and including a modem coupled to a telephone line. At least one of the devices is configured to receive entitlement information corresponding to the other devices via the broadband signal, and to use the entitlement information to periodically authenticate the other devices via the telephone line.

In another embodiment of the invention, several methods are disclosed for detecting a device connected to a telephone line. A first method includes driving a first predetermined sequence of dual-tone multifrequency (DTMF) codes on the telephone line, and monitoring the telephone line for a second predetermined sequence of DTMF codes. A second method includes monitoring the telephone line for the first predetermined sequence of DTMF codes, and responding to the first predetermined sequence of DTMF codes by driving a second predetermined sequence of DTMF codes on the telephone line.

A further described method for authenticating at least one device connected to a telephone line includes receiving entitlement information corresponding to each of the at least one device via a broadband signal, and using the entitlement information to authenticate each of the at least one devices via the telephone line.

BRIEF DESCRIPTION OF THE DRAWINGS

The invention may be understood by reference to the following description taken in conjunction with the accompanying drawings, in which like reference numerals identify similar elements, and in which.

DETAILED DESCRIPTION OF THE PREFERRED EMBODIMENTS

In the following disclosure, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention, and are considered to be within the understanding of persons of ordinary skill in the relevant art. It is further noted that all functions described herein may be performed in either hardware or software, or a combination thereof, unless indicated otherwise.

Figure 1:
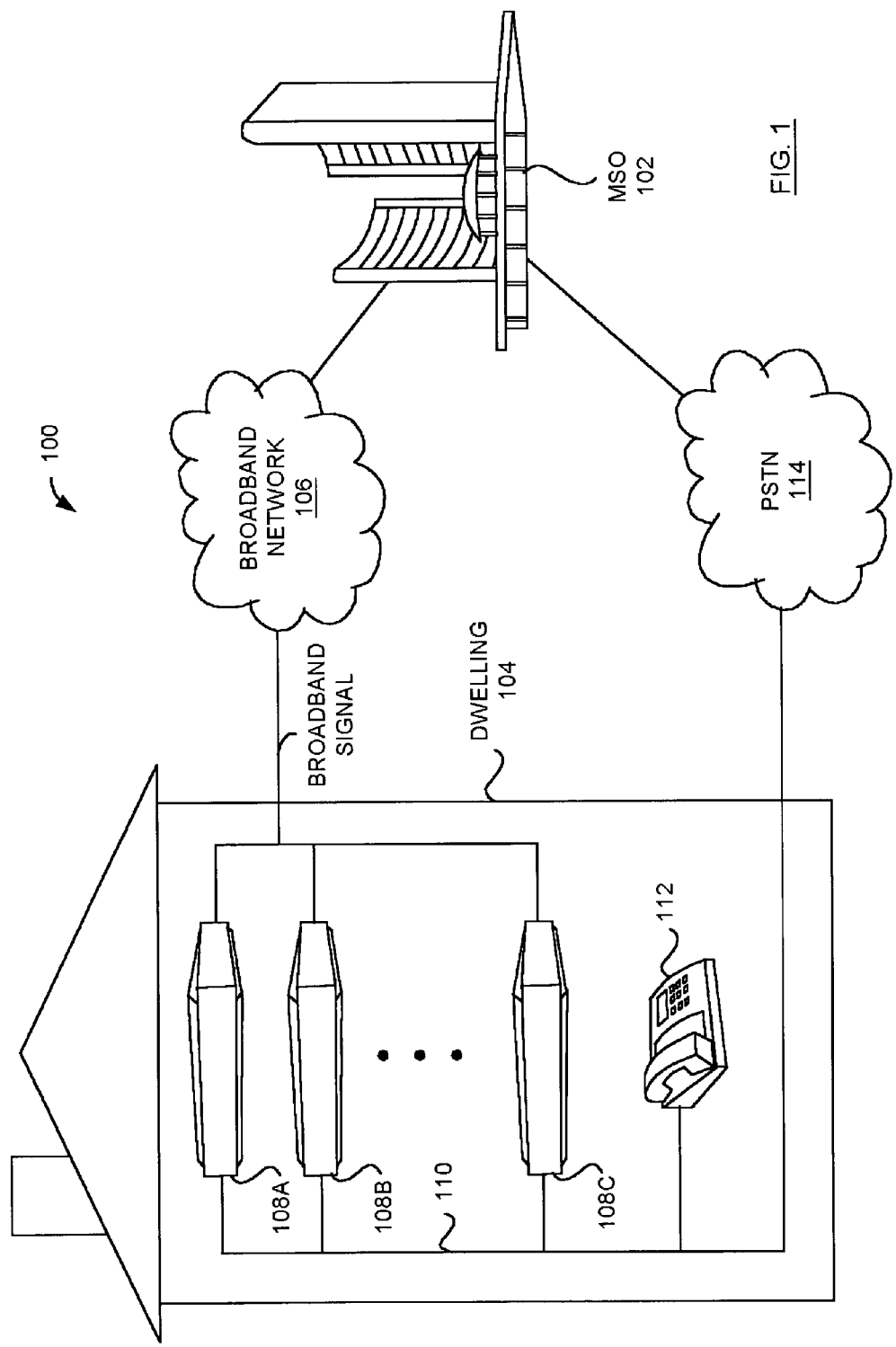
FIG. 1 is a diagram of a broadband signal distribution system wherein a multiple service operator (MSO) provides a broadband signal to a dwelling of a subscriber, and wherein multiple integrated receiver decoders (IRDs) exist within the dwelling.

FIG. 1 is a diagram of a broadband signal distribution system 100 wherein a multiple services operator (MSO) 102 provides a broadband signal to a dwelling 104 of a subscriber via a broadband network 106. In general, a multiple service operator (MSO) is a service provider that provides multiple services to subscribers. The multiple services may include, for example, one or more "basic" services and the one or more conditional access services. The MSO may provide the basic services for a set fee (e.g., a set monthly fee), and provide each of the conditional access services for an additional fee (e.g., an additional monthly fee). Examples of basic services the MSO 102 may provide include television programming, data transmission services, and interactive services.

Each conditional access service is typically provided via a conditional access signal that is scrambled and/or encrypted (i.e., encoded) as described above. Examples of conditional access services the MSO 102 may provide include premium television channels and special broadcasts (e.g., sporting events, pay-per-view movies, etc.), data transmission services, interactive services, digital radio broadcasts, digital data broadcasts, and interactive services.

In general, the broadband signal is used to convey the multiple services to the dwelling 104. A typical broadband signal includes multiple signals conveying the multiple services. The broadband signal may also include one or more conditional access signals conveying the one or more conditional access services. The broadband signal may be, for example, frequency division multiplexed and/or time division multiplexed to convey the multiple signals to the dwelling 104.

The broadband network 106 may include, for example, a cable network, a satellite network, and/or a terrestrial broadcast network. In a cable network, the broadband signal is typically distributed via coaxial cable. In a satellite network, the broadband signal is transmitted to a satellite via an uplink satellite dish antenna, and received by a downlink satellite dish antenna. The downlink satellite dish antenna may be, for example, attached to, or adjacent to, the dwelling 104. In a terrestrial broadcast network, the broadband signal is transmitted via a transmitting antenna, and received by a receiving antenna. The receiving antenna may be, for example, attached to, or adjacent to, the dwelling 104.

In FIG. 1, multiple integrated receiver decoders (IRDs) 108A–108C exist within the dwelling 104, and receive the broadband signal. In general, an integrated receiver decoder (IRD) is a device adapted to receive a broadband signal generally including a conditional access signal, and may be configurable to descramble or decrypt any conditional access signals. The IRDs 108A–108C are referred to below individually and interchangeably as IRD 108 and collectively as IRDs 108.

As shown in FIG. 1, the IRDs 108 are connected to a telephone line 110 within the dwelling 104, along with a telephone 112. The telephone line 110 is connected to a public switched telephone network (PSTN) 114. The MSO 102 is also connected to the PSTN 114. As described below, each IRD 108 includes a modulator-demodulator (modem) for communicating with the MSO 102 via the PSTN 114. This is typical of modem IRDs to facilitate periodic transfers of service usage information from the IRDs 108 to the MSO 102 for billing or other purposes.

Figure 2:
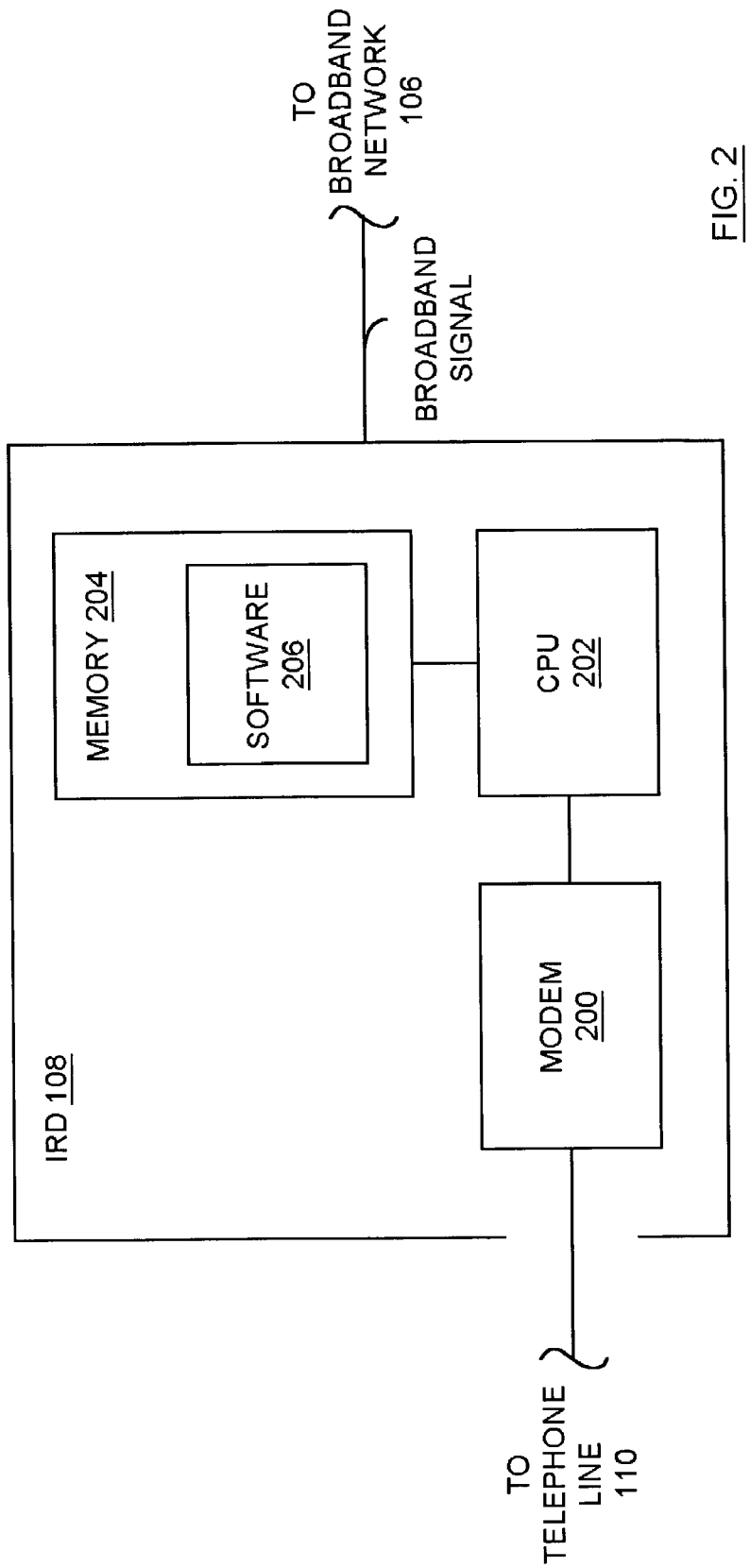
FIG. 2 is a diagram of one embodiment of an exemplary one of the IRDs of FIG. 1, wherein the exemplary IRD includes a memory having software stored therein.

FIG. 2 is a diagram of one embodiment of an exemplary one of the IRDs 108 of FIG. 1. In the embodiment of FIG. 2, the IRD 108 includes a modulator-demodulator (modem) 200, a central processing unit (CPU) 202, and a memory 204. The modem 200 is connected to the telephone line 110 of FIG. 1, and is used to transmit and receive signals via the telephone line 110.

The CPU 202 is coupled to the memory 204 and the modem 200. As shown in FIG. 2, the memory 204 is used to store software 206 including program instructions and data. The CPU 202 is configured to control the modem 200 while executing program instructions of the software 206.

As described in detail below, the CPU 202 uses the modem 200 to periodically: (i) detect and authenticate other IRDs connected to the telephone line 110 and within the dwelling 104 via the telephone line 110, and/or (ii) be detected and authenticated by another IRD connected to the telephone line 110 and within the dwelling 104 via the telephone line 110.

Referring back to FIG. 1, a single one of the IRDs 108 in FIG. 1 may be responsible for detecting and/or authenticating all of the other IRDs 108 connected to the telephone line 110 within the dwelling 104. For example, the IRD 108A may be responsible for detecting and authenticating the IRDs 108B and 108C connected to the telephone line 110 within the dwelling 104. In this situation, the IRD 108A detects and authenticates the IRDs 108B and 108C, and the IRDs 108B and 108C are detected and authenticated by the IRD 108A.

Alternately, each of the IRDs 108 may be responsible for detecting and/or authenticating all of the other IRDs 108 connected to the telephone line 110 within the dwelling 104. For example, the IRD 108A may be responsible for detecting and authenticating the IRDs 108B and 108C, the IRD 108B may be responsible for detecting and authenticating the IRDs 108A and 108C, and the IRD 108C may be responsible for detecting and authenticating the IRDs 108A and 108B. In this situation, each of the IRDs 108 is detecting and authenticating other IRDs 108 at some times, and being detected and authenticated by other IRDs 108 at other times.

The detection and authentication status of the IRDs 108 may be periodically reported back to the MSO 102 via the telephone line 110 as a part of the service usage information.

Figure 3:
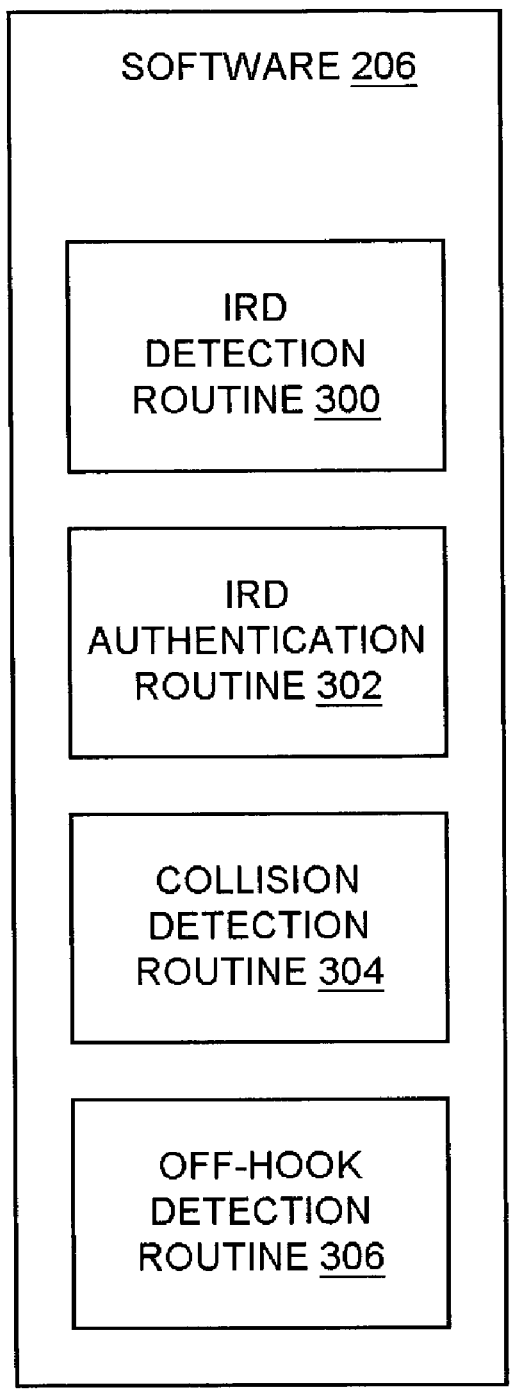
FIG. 3 is a diagram of one embodiment of the software of FIG. 2.

FIG. 3 is a diagram of one embodiment of the software 206 of FIG. 2. In the embodiment of FIG. 3, the software 206 includes an IRD detection routine 300, an IRD authentication routine 302, a collision detection routine 304, and an off-hook detection routine 306.

The IRD detection routine 300 detects the presence of other IRDs 108 coupled to the telephone line 110 in the subscriber dwelling 104. The IRD authentication routine 302 authenticates any IRDs 108 detected in the dwelling 104. The detection and authentication routines 300 and 302 may utilize DTMF codes or other means of communication via the telephone line 110. A collision detection routine 304 handles the potential collision of communications on the shared telephone line 110. The off-hook detection routine 306 detects whether a phone on the telephone line 110 in the dwelling 104 has been picked-up for usage in order to suspend, relay, or cease communications between the IRDs 108. The function and purposes of these routines are further described herein. It should be recognized, however, that each of these routines and their functions could be implemented in either software or hardware modules or routines.

Figure 4:
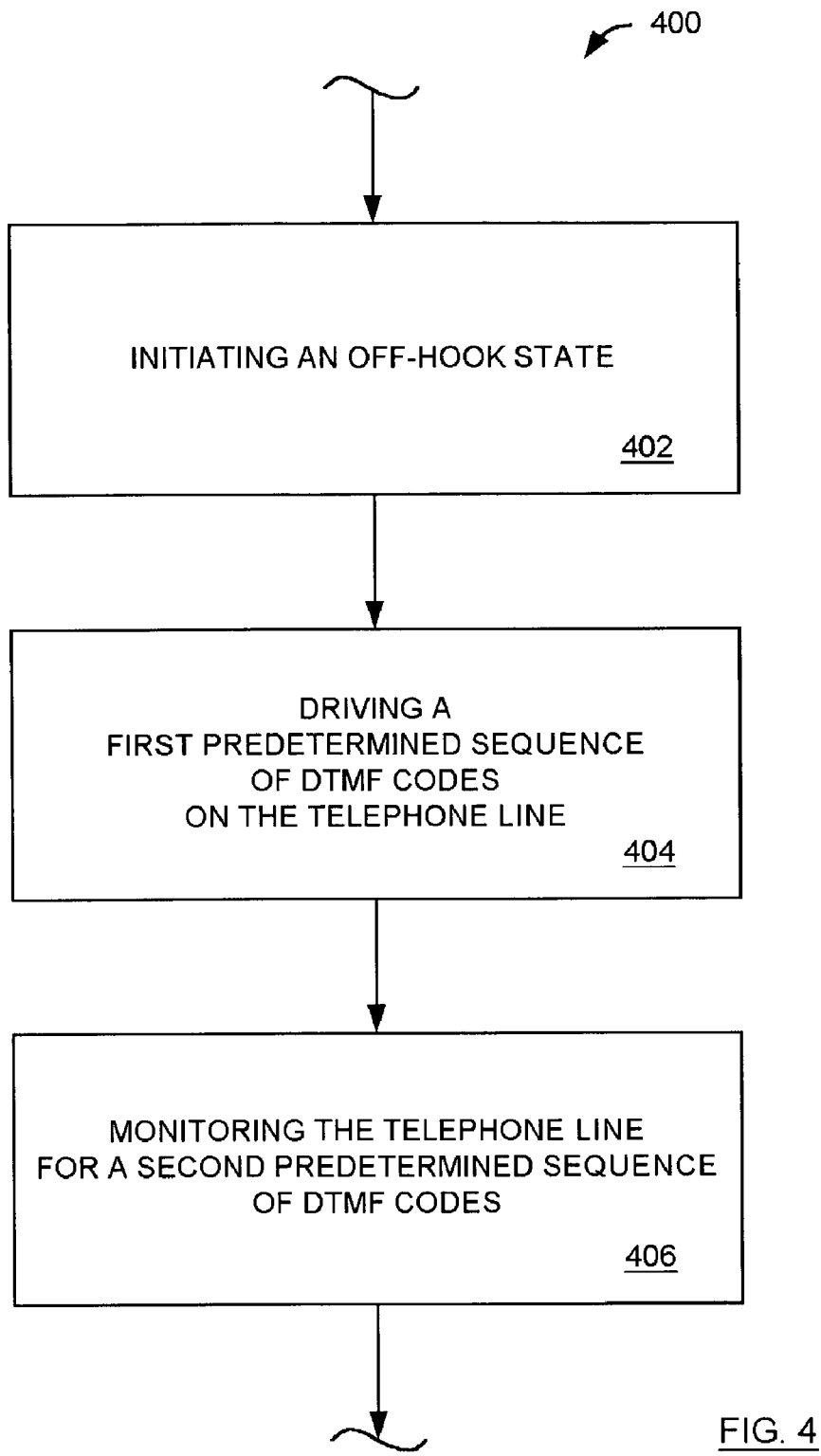
FIG. 4 is a flow chart of one embodiment of a first method for detecting one or more devices connected to a telephone line.

FIG. 4 is a flow chart of one embodiment of a first method 400 for detecting one or more devices (e.g., IRDs 108 of FIG. 1) connected to a telephone line (e.g., the telephone line 110 of FIG. 1). The first method 400 may be carried out by a device (e.g., an IRD) connected to the telephone line and configured to detect one or more other devices (e.g., other IRDs) connected to the telephone line. The method 400 may be embodied within the IRD detection routine 300 of FIG. 3, and implemented by the CPU 202 of FIG. 2 via the modem 200 of FIG. 2 when executing program instructions of the IRD detection routine 300.

In an operation 402 of the method 400, an off-hook state is initiated. The off-hook state is normally used to signal the PSTN 114 of FIG. 1 that a user wants to use the telephone line 110 of FIG. 1. For example, in a typical configuration, the telephone line 110 includes a pair of wires referred to as a "loop." A central office of the PSTN 114 couples an electrical voltage across the pair of wires and monitors electrical current flow through the loop. When the user wants to use the telephone line 110, the user closes a switch within a communication device connected to the telephone line 110 (e.g., by lifting a handset of the telephone 112), thereby initiating an off-hook state of the communication device. This switch closure causes electrical current to flow through the loop, signaling the central office that the user wants to use the telephone line 110. Upon detecting the electrical current flowing through the loop, the central office prepares to store dialed digits and drives a dial tone signal across the pair of wires of the telephone line 110.

In an operation 404, a first predetermined sequence of dual-tone multifrequency (DTMF) codes is driven on the telephone line. Modern telephones include keypads with numbered buttons. The act of "dialing" a telephone number involves pressing the numbered buttons of the keypad in sequence. Pressing a button of the keypad causes a DTMF signal or code to be driven on the telephone line 110 of FIG. 1. The DTMF code includes two non-harmonic tones. The DTMF code is received by switching equipment in the central office of the PSTN 114 of FIG. 1 and decoded. The sequence of dialed numbers is used to determine which telephone subscriber is to receive the telephone call.

The first predetermined sequence of DTMF codes may be, for example, a telephone number. The telephone number may be, for example, a toll-free telephone number of the MSO 102 of FIG. 1, or a local access number of the MSO 102. This may be advantageous in the event the MSO 102 wants to monitor or record the results of IRD detection operations. Alternately, the first predetermined sequence of DTMF codes may be a telephone number that will not result in a complete connection via the PSTN 114 of FIG. 1. For example, in the United States, the block of numbers between 555-0100 and 555-0199 will not result in a connection via the PSTN 114 of FIG. 1

In an operation 406, the telephone line is monitored for a second predetermined sequence of DTMF codes. Reception of the second predetermined sequence of DTMF codes indicates another device is connected to the telephone line, is operational, and is ready to communicate.

Driving the first predetermined sequence of DTMF codes and/or the second predetermined sequence of DTMF codes on the telephone line may result in a telephone number being dialed. In situations where the telephone number does not result in a complete connection via the PSTN 114 of FIG. 1, the central office of the PSTN 114 may drive one or more special information tones and/or a verbal error message on the telephone line 110 of FIG. 1. Such special information tones and verbal error messages represent noise signals of substantial amplitude during the operation 406. However, the operation 406 may be reliably carried out in the presence of any special information tones and/or verbal error messages generated remotely by the PSTN 114.

Prior to the operation 402, a determination may be made as to whether any device connected to the telephone line (e.g., the telephone line 110 of FIG. 1) is in an off-hook state. If so, a device carrying out the operation 402 may suspend, delay, or cease operation, and may check again after a predetermined time to see if any device connected to the telephone line is in an off-hook state. If not, the operation 402 may be performed.

Figure 5:
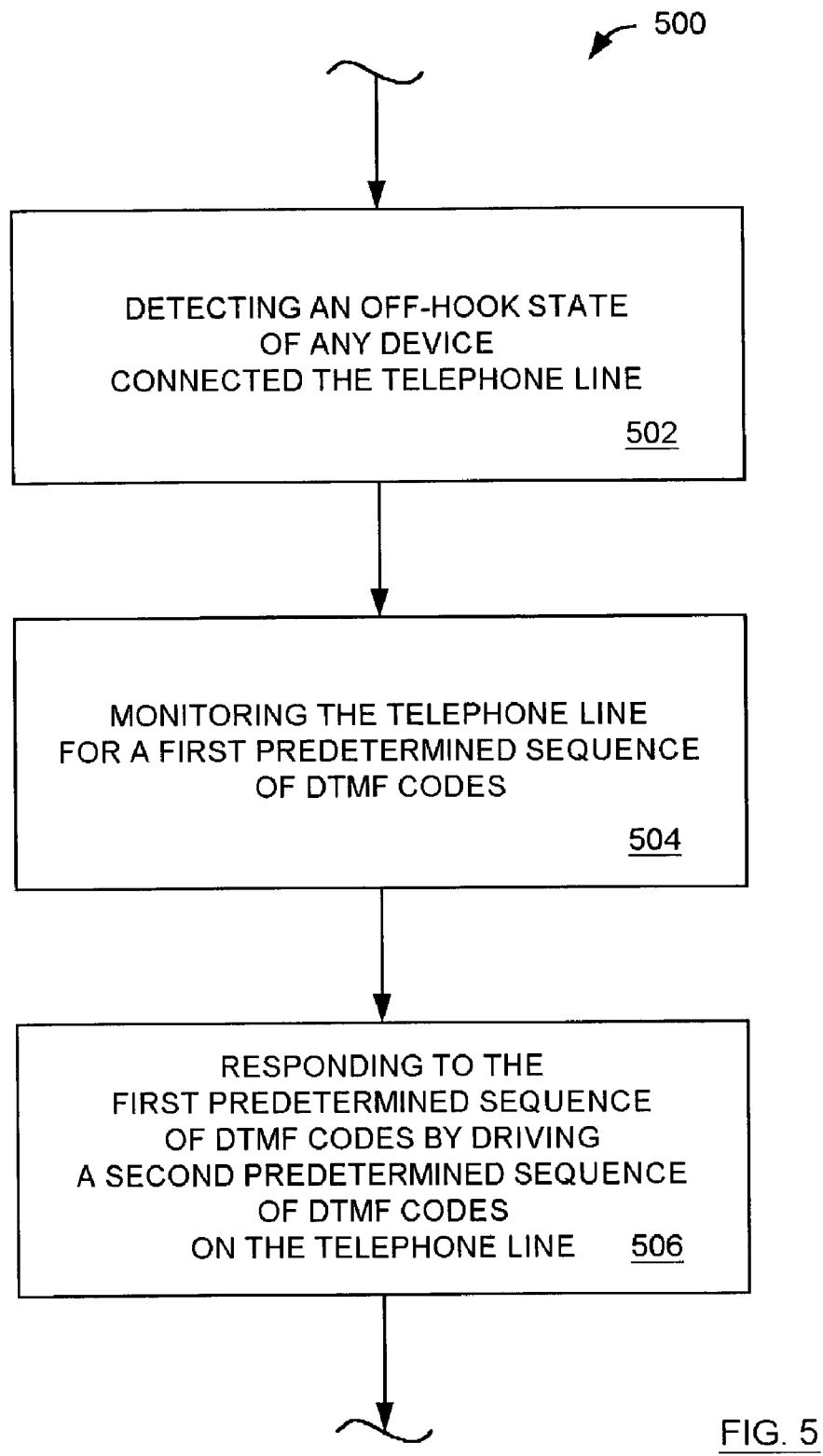
FIG. 5 is a flow chart of one embodiment of a second method for detecting a device connected to a telephone line.

FIG. 5 is a flow chart of one embodiment of a second method 500 for detecting a device (e.g., an IRD 108 of FIG. 1) connected to a telephone line (e.g., the telephone line 110 of FIG. 1). The second method 500 may be carried out by a device (e.g., an IRD) connected to the telephone line and configured to be detected by other devices (e.g., other IRDs) connected to the telephone line. The method 500 may be embodied within the IRD detection routine 300 of FIG. 3, with or without the method 400 of FIG. 4, and implemented by the CPU 202 of FIG. 2 via the modem 200 of FIG. 2 when executing program instructions of the IRD detection routine 300.

In an operation 502 of the method 500, an off-hook state of any device connected to the telephone line is detected. The telephone line is monitored for the first predetermined sequence of dual tone multi-frequency (DTMF) codes described above during an operation 504. During an operation 506, when the first predetermined sequence of dual tone multi-frequency (DTMF) codes is received, the second predetermined sequence of DTMF codes described above is driven on the telephone line. The driving of the second predetermined sequence of DTMF codes on the telephone line by a device (e.g., an IRD) indicates the device is connected to the telephone line, is operational, and is ready to communicate.

Figure 6:
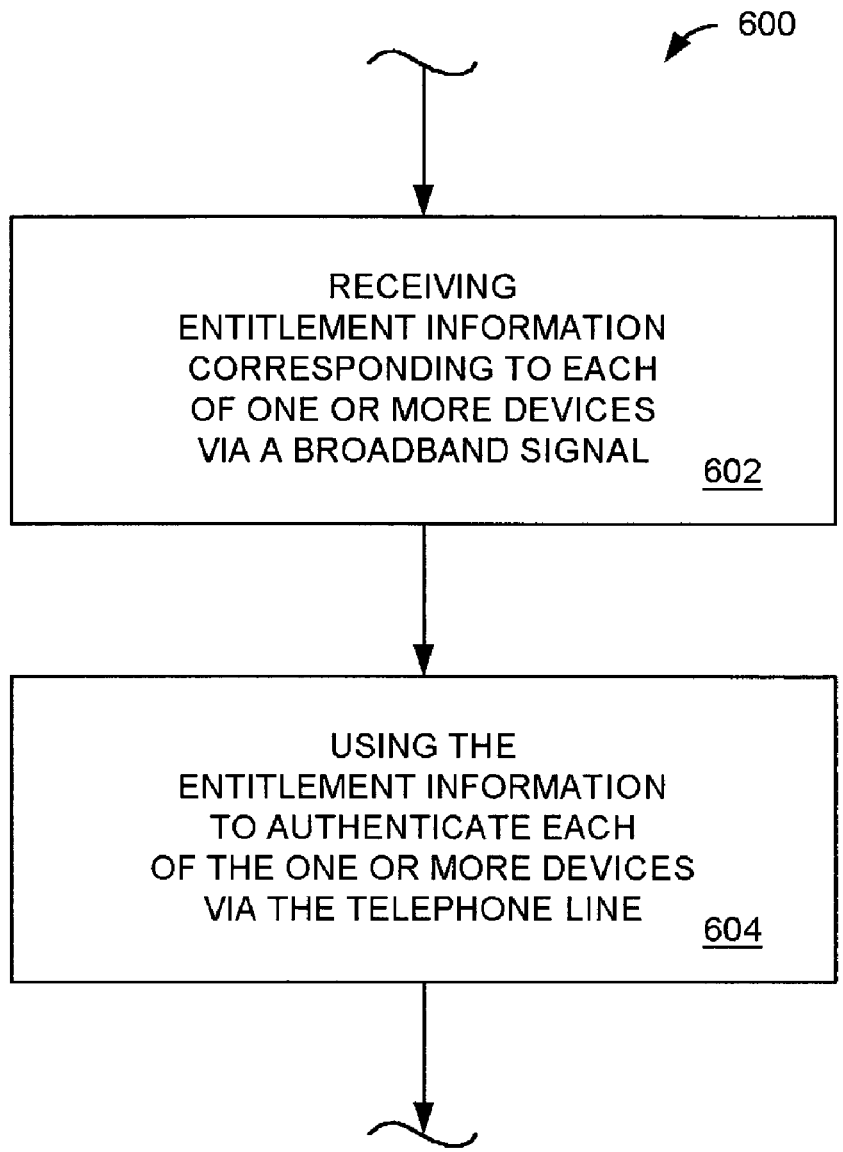
FIG. 6 is a flow chart of one embodiment of a method for authenticating one or more devices connected to a telephone line.

FIG. 6 is a flow chart of one embodiment of a method 600 for authenticating one or more devices (e.g., one or more of the IRDs 108 of FIG. 1) connected to a telephone line (e.g., the telephone line 110 of FIG. 1). The method 600 may be carried out by a device (e.g., an IRD) connected to the telephone line and configured to detect and authenticate other devices (e.g., other IRDs) connected to the telephone line. The method 600 may be embodied within the IRD authentication routine 302 of FIG. 3, and implemented by the CPU 202 of FIG. 2 via the modem 200 of FIG. 2 when executing program instructions of the IRD authentication routine 302.

In an operation 602 of the method 600, entitlement information corresponding to each of the one or more devices connected to the telephone line is received via a broadband signal. In known conditional access systems, entitlement information is conveyed via messages inserted into conditional access signals by conditional access encoding equipment. Such messages typically include entitlement management messages (EMMs) and entitlement control messages (ECMs). The EMMs are used to modify entitlement information (e.g., a list of conditional access services a subscriber is entitled to access) stored in an IRD.

In general, each subscriber IRD having a smart card is expected to be located within the subscriber's dwelling at all times. To aid in determining the presence of IRDs within particular dwellings, each IRD may be assigned a unique identification string or number. For example, each of the IRDs 108 of FIG. 1 may be expected to be located within the dwelling 104 of FIG. 1 at all times, and may be assigned a unique identification string or number. The unique identification strings or numbers may be assigned during IRD manufacture, or arbitrarily by the MSO 102 of FIG. 1. One or more EMMs inserted into the conditional access signal may be modified to include a list of the unique identification strings or numbers assigned to IRDs expected to be located in a particular dwelling.

In an operation 604, the entitlement information is used to authenticate each of the one or more devices via the telephone line. In general, authentication involves a first party and a second party. The second party provides information to the first party to prove the identity of the second party. For example, a modem routine may be initiated with each of the one or more devices in sequence. During each modem routine, a command may be issued to provide the unique identification string or number assigned to the device. A received identification string or number may be compared to a list of identification strings or numbers of devices expected to be connected to the telephone line. The modem routine may be carried out using a signal modulation technique such as frequency shift keying (FSK), using DTMF tones, or other communication signals.

For example, in one embodiment of the broadband signal distribution system 100 of FIG. 1, a "master" one of the IRDs 108 detects and authenticates the other "slave" IRDs 108 within the dwelling 104 of FIG. 1 via the telephone line 110. The method 400 of FIG. 4 may be embodied within the IRD detection routine 302 (FIG. 3) of the master IRD 108, and the method 600 of FIG. 6 may be embodied within the IRD authentication routine 304 (FIG. 3) of the master IRD 108. The method 500 of FIG. 5 may be embodied within the IRD detection routine 302 (FIG. 3) of each of the slave IRDs 108.

The master IRD may periodically detect and authenticate the slave IRDs 108 via the telephone line 110 of FIG. 1. After detecting the slave IRDs 108 via the method 400 of FIG. 4, the master IRD 108 may initiate the IRD authentication routine 304. During the IRD authentication routine 304, the master IRD 108 may initiate a modem routine with each of the slave IRDs 108 in sequence. During each modem routine, the master IRD 108 may issue a command to a slave IRD 108 to provide the identification string or number assigned to the slave IRD 108. The master IRD 108 may compare the identification string or number received from the slave IRD 108 to a list of identification strings or numbers of IRDs expected to be located within the dwelling 104 of FIG. 1 and connected to the telephone line 110.

At the end of each modem routine, the master IRD 108 may issue a terminate command to the slave IRD 108, and the slave IRD 108 may transmit an acknowledgment response back to the master IRD 108. Following transmission of the acknowledgment response, the slave IRD 108 may enter an inactive state with regard to any further communication during the current authentication session.

If each of the slave IRDs 108 expected to be located within the dwelling 104 of FIG. 1 and connected to the telephone line 110 is detected and returns a correct identification string or number, the master IRD 108 remains in a fully functional state. On the other hand, if the one or more of the slave IRDs 108 is not detected, or returns an incorrect identification string or number, the master IRD 108 enters a state of minimal functionality. When the master IRD 108 is in the state of minimal functionality, the subscriber may be notified that one or more expected slave IRDs were not detected, or returned an incorrect identification string or number. The subscriber may be provided with instructions for solving the problem and/or reinitiating the IRD detection routine 302 and the IRD authentication routine 304.

Alternately, the master IRD 108 may include a counter associated with the detection method 400 of FIG. 4 and the authorization method 600 of FIG. 6. The counter may be initialized to zero each time all of the slave IRDs 108 expected to be located within the dwelling 104 of FIG. 1 are detected and authenticated. Each time one or more of the slave IRDs 108 is not detected and/or authenticated, the counter may be incremented. If the counter within the master IRD 108 reaches a specific value, the master IRD 108 may enter the state of minimal functionality described above.

A challenge-response authentication technique may be used during the operation 604 of the method 600. For example, each of the IRDs 108 in FIG. 1 may include a pseudo-random number generator. Each pseudo-random number generator may be configured to generate a different pseudo-random number, and may use a last pseudo-random number as a seed in generating a next pseudo-random number. Each pseudo-random number generated by an IRD 108 may be stored in a non-volatile memory of the IRD 108 to prevent loss when power to the IRD 108 is interrupted. One or more EMMs inserted into the conditional access signal may be modified to include a list of pseudo-random numbers expectedly generated by IRDs expectedly located in a particular dwelling.

In the above example, during each modem routine, the master IRD 108 may issue a command to a slave IRD 108 to generate a (next) pseudo-random number, and drive the pseudo-random number on the telephone line 110 of FIG. 1. The master IRD 108 may compare the pseudo-random number received from the slave IRD 108 to the list of pseudo-random numbers expected to be returned by IRDs located within the dwelling 104 of FIG. 1 and connected to the telephone line 110.

Referring back to FIG. 3, the software 206 includes a collision detection routine 304. In the above example, when the master IRD 108 detects the slave IRDs 108 via the method 400 of FIG. 4, and drives the first predetermined sequence of dual tone multi-frequency (DTMF) codes on the telephone line during the operation 404, all of the slave IRDs 108 may attempt to respond at the same time. The collision detection routine 304 may be used to effect communication with each of the slave IRDs 108 in sequence.

For example, while executing the program instructions of the collision detection routine 304, the CPU 202 of FIG. 2 may use the modem 200 of FIG. 2 to monitor the telephone line 110 for the presence of a signal prior to transmitting each data unit (e.g., character). A signal detected on the telephone line 110 may indicate a collision, and the CPU 202 may stop transmitting and wait a random length of time before attempting to transmit again. As each slave IRD 108 detecting a collision expectedly waits a different amount of time, sequential communications with each of the slave IRDs 108 is expectedly achieved. In general, any multidrop communication protocol that does not require a slave IRE 108 to know how many IRDs 108 exist within the dwelling 104 may be used to determine which of the slave IRDs 108 establishes a connection with the master IRD 108.

The software 206 of FIG. 3 also includes an off-hook detection routine 306. While executing the program instructions of the off-hook detection routine 306, the CPU 202 of FIG. 2 may use the modem 200 of FIG. 2 to monitor the telephone line 110 for an indication of an off-hook state in any device coupled to the telephone line 110.

The off-hook detection routine 306 may be used to carry out the operation 502 of the method 500 of FIG. 5, and to detect an off-hook condition in any device coupled to the telephone line 110 prior to and/or during the detecting method 400 of FIG. 4, and during the operation 604 of the authentication method 600 of FIG. 6. For instance, in the above example, if an off-hook state is detected in of any other device connected to the telephone line prior to or during the detecting method 400 of FIG. 4, or during the operation 604 of the authentication method 600 of FIG. 6, the master IRD 108 may then suspend, delay or terminate the current operation and reinitiate the detecting method 400 of FIG. 4 and/or the operation 604 of the authentication method 600 of FIG. 6 at a later time.

Each IRD 108 in FIG. 1 may include a counter associated with the off-hook detection routine 306, the detection method 400 of FIG. 4, and the authorization method 600 of FIG. 6. The counter may be initialized to zero each time all of the IRDs expected to be located within a particular dwelling are detected and authenticated. Each time all of the IRDs expected to be located within a particular dwelling are not detected and/or authenticated, or the detection and/or authorization is terminated due to an off-hook state of another device, the counter may be incremented. If the counter within an IRD 108 reaches a specific value, the IRD 108 may enter the state of minimal functionality described above.

Referring back to FIG. 1, in the embodiment of the broadband signal distribution system 100 where each of the IRDs 108 detect and authenticate the other IRDs 108 within the dwelling 104 of FIG. 1 via the telephone line 110, the detection method 400 of FIG. 4 and the detection method 500 of FIG. 5 may be embodied within the IRD detection routine 302 (FIG. 3) of the each of the IRD 108s, and the authentication method 600 of FIG. 6 may be embodied within the IRD authentication routine 304 (FIG. 3) of each of the IRDs 108.

Each of the IRDs 108 may periodically detect and authenticate the other IRDs 108, at different times, via the telephone line 110 of FIG. 1. After detecting the other IRDs 108 via the method 400 of FIG. 4, an initiating IRD 108 may initiate the IRD authentication routine 304. During the IRD authentication routine 302, the initiating IRD 108 may initiate a modem routine with each of the other IRDs 108 (e.g., with each of the non-initiating IRDs 108) in sequence. During each modem routine, the initiating IRD 108 may issue a command to a non-initiating IRD 108 to provide the identification string or number assigned to the non-initiating IRD 108. The initiating IRD 108 may compare the identification string or number received from the non-initiating IRD 108 to a list of identification strings or numbers of IRDs expected to be located within the dwelling 104 of FIG. 1 and connected to the telephone line 110.

If each of the non-initiating IRDs 108 expected to be located within the dwelling 104 of FIG. 1 and connected to the telephone line 110 is detected and returns a correct identification string or number, the initiating IRD 108 remains in a fully functional state. On the other hand, if the one or more of the non-initiating IRDs 108 is not detected, or returns an incorrect identification string or number, the initiating IRD 108 enters a state of minimal functionality. When the initiating IRD 108 is in the state of minimal functionality, the subscriber may be notified that one or more expected non-initiating IRDs 108 were not detected, or returned an incorrect identification string or number. The subscriber may be provided with instructions for solving the problem and/or reinitiating the IRD detection routine 302 and the IRD authentication routine 304.

The detection methods 400 and 500 and the authentication method 600 may be performed late at night when occupants of the dwelling 104 of FIG. 1 are less likely to be using the telephone line 110 of FIG. 1. It is noted that existing telephone wiring installed within the dwelling 104 of FIG. 1 is advantageously used to provide a communication path between all of the IRDs 108 located within that dwelling 104. Also, a modem expectedly present in each of the IRDs 108 to convey service information to the MSO 102 of FIG. 1 is advantageously used to carry out the above described detection and authentication methods within the dwelling 104. As such, detection and authentication of all IRDs within a dwelling is made possible at minimal expense to an MSO, and at no additional cost to the MSO on a per-subscriber basis.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

I claim:

1. A system, comprising:
a plurality of devices, each connected between a broadband network and a telephone line,
adapted to receive a broadband signal from the broadband network and
comprising a modem for coupling to the telephone line;
wherein each one of the plurality of devices is configured to receive,
from the broadband network, entitlement information corresponding to every other one of the plurality of devices and to use the entitlement information to authenticate every other one of the plurality of devices via the telephone line.

2. The system as recited in claim 1, wherein the broadband signal received by each one of the plurality of devices includes the entitlement information for every other one of the plurality of devices.

3. The system as recited in claim 1, wherein the broadband signal comprises a conditional access signal, and wherein the conditional access signal comprises the entitlement information for every other one of the plurality of devices and scrambled or encrypted video information.

4. The system as recited in claim 1, wherein, for each one of the plurality of devices, as long as the device is able to detect and authenticate every other one of the plurality of devices, the device will remain fully functional.

5. The system as recited in claim 1, wherein, for each one of the plurality of devices, in the event the device is not able to detect and authenticate every other one of the plurality of devices, the device enters a state of minimal functionality.

6. The system as recited in claim 1, wherein detection of the other devices by the at least one device further comprises monitoring the telephone line for a second predetermined sequence of DTMF codes from the other devices.

7. A method by which a plurality of devices connected between a broadband network and a telephone line may detect one another, comprising:
if a first one of the plurality of devices is to detect a second one of the plurality of devices, the first device:
driving a first predetermined sequence of dual-tone multifrequency (DTMF) codes on the telephone line; and
monitoring the telephone line for a second predetermined sequence of DTMF codes; and
if the second one of the plurality of devices is to detect the first one of the plurality of devices, the second device:
driving a third predetermined sequence of DTMF codes on the telephone line; and
monitoring the telephone line for a fourth predetermined sequence of DTMF codes.

8. The method as recited in claim 7, further comprising:
determining if any of the plurality of devices connected between the broadband network and the telephone line is in an off-hook state; and
if any of the plurality of devices connected between the broadband network and the telephone line is in the off-hook state, waiting a predetermined period of time before driving either the first predetermined sequence of DTMF codes or the third predetermined sequence of DTMF codes.

9. A method by which a first device connected between a broadband network and a telephone line may detect a second device connected between the broadband network and the telephone line, comprising:
the second device monitoring the telephone line for a first predetermined sequence of dual-tone multifrequency (DTMF) codes generated by the first device; and
the second device responding to the first predetermined sequence of DTMF codes generated by the first device by driving a second predetermined sequence of DTMF codes on the telephone line;
wherein the first predetermined sequence of DTMF codes generated by the first device comprises a telephone number and a third predetermined sequence of DTMF codes following the telephone number, and wherein the responding comprises:
the second device responding to the third predetermined sequence of DTMF codes by driving the second predetermined sequence of DTMF codes on the telephone line.

10. A method by which a plurality of devices connected between a broadband network and a telephone line may authenticate one another, comprising:
if a first one of the plurality of devices is to authenticate a second one of the plurality of devices, the first device driving, on the telephone line, a first predetermined sequence of dual-tone (DTMF) codes and the second device responding to the first predetermined sequence of DTMF codes by driving a second predetermined sequence of DTMF codes on the telephone line;
if the second device is to authenticate the first device, the second device driving a third predetermined sequence of DTMF codes on the telephone line and the first device responding to the third predetermined sequence of DTMF codes by driving a fourth predetermined sequence of DTMF codes on the telephone line,
the first and second devices receiving entitlement information corresponding to each of the plurality of devices from a broadband signal received from the broadband network;
if the first device is to authenticate the second device, the first device using the entitlement information to authenticate the second device via the telephone line; and
if the second device is to authenticate the first device the second device using the entitlement information received from the broadband network to authenticate the first device.

11. The method as recited in claim 10, wherein the entitlement information comprises information that uniquely identifies each of the plurality of devices.

12. The method as recited in claim 10, wherein the broadband signal comprises a conditional access signal, and wherein the conditional access signal comprises the entitlement information and scrambled or encrypted video information.

13. The method as recited in claim 12, wherein the broadband signal is received via a cable network, a satellite network, or a terrestrial television broadcast network.

14. The method as recited in claim 10, further comprising: remaining in a fully functional state if each of the at least one expected devices is authenticated.

15. The method as recited in claim 10, further comprising: entering a state of minimal functionality if each of the at least one expected devices is not authenticated.

16. The method as recited in claim 10, further comprising: monitoring the telephone line for an off-hook state of any other device connected to the telephone line;
terminating the using if the off-hook state is detected in any other device connected to the telephone line; and
reinitiating the using at a later time if the off-hook state is detected in any other device connected to the telephone line.

17. The method as recited in claim 10, further comprising: determining that each of the at least one devices is connected to the telephone line and operational.

18. The method as recited in claim 10, wherein each of the at least one devices is authenticated one at a time.

19. The method as recited in claim 10, further comprising: monitoring the telephone line for a second predetermined sequence of DTMF codes from the at least one device.

20. A system, comprising:
a plurality of devices, each of which are (1) connected between a broadband network and a telephone line, and (2) adapted to receive a broadband signal from the broadband network;
wherein each one of the plurality of devices is configured to receive entitlement information corresponding to every other one of the plurality of devices via the broadband network and to use the entitlement information to authenticate every other one of the plurality of devices via the telephone line; and
wherein each one of the plurality of devices configured to receive entitlement information corresponding to every other one of the plurality of devices detects the other ones of the plurality of devices by driving a first predetermined sequence of dual-tone multifrequency (DTMF) codes and monitoring the telephone line for a second predetermined sequence of DTMF codes.

21. The system as recited in claim 20 wherein the first predetermined sequence of DTMF codes is comprised of a telephone number.

22. A system, comprising:
a plurality of devices, said plurality of devices serially coupled between a broadband network and a telephone line and coupled in parallel to one another;
each of the plurality of devices configured to receive a broadband signal containing entitlement information; and
each of the plurality of device further configured use the entitlement information contained in the received broadband signal to authenticate every other one of the plurality of devices via the telephone line.

23. The system as recited in claim 22, wherein: each of the plurality of devices is configured to authenticate every other one of the plurality of devices by driving a first predetermined sequence of dual-tone multifrequency (DTMF) codes on the telephone line and detecting a second predetermined sequence of DTMF codes on the telephone driven by a first one of the every other one of the plurality of devices being authenticated.

24. The system as recited in claim 23, wherein the telephone line is coupled to the public switched telephone network (PSTN).

25. The system as recited in claim 24, wherein the first predetermined sequence of DTMF codes is a first telephone number and the second predetermined sequence of DTMF codes is a second telephone number.

26. The system as recited in claim 25, wherein the first and second telephone numbers are numbers that do not result in a connection via the PSTN.

27. The system as recited in claim 25, and further comprising a multiple services operator (MSO) coupled to the broadband network and to the PSTN, the MSO providing each of the plurality of devices with the broadband signal containing the entitlement information via the broadband network.

28. The system as recited in claim 26, wherein the first telephone number establishes a connection, over the PSTN, between the system and the MSO.

29. The system as recited in claim 28, wherein the MSO is configured to monitor the authentication process over the connection established between the system and the MSO.

30. The system as recited in claim 28, wherein the second telephone number establishes a connection, over the PSTN, between the system and the MSO.

31. The system as recited in claim 30, wherein the MSO is configured to monitor the authentication process over the connection established between the system and the MSO.

* * * * *